United States Patent [19]

Martinez, Jr.

[11] Patent Number: 4,966,127
[45] Date of Patent: Oct. 30, 1990

[54] METHOD AND APPARATUS FOR SAVING ENERGY IN DIRECT FIRED BOILERS

[76] Inventor: George Martinez, Jr., P.O. Box 1141, Gonzales, La. 70737

[21] Appl. No.: 145,554

[22] Filed: Jan. 19, 1988

[51] Int. Cl.$^5$ ............................................... F24H 1/00
[52] U.S. Cl. .................................... 126/362; 237/8 A; 126/374
[58] Field of Search ............... 126/362, 374; 237/2 A, 237/8 A

[56] References Cited

U.S. PATENT DOCUMENTS

| | | | |
|---|---|---|---|
| 4,385,724 | 5/1983 | Ramsauer et al. | 126/362 X |
| 4,535,931 | 8/1985 | Bartok et al. | 126/374 X |
| 4,537,348 | 8/1985 | Gössi | 126/374 X |
| 4,606,325 | 8/1986 | Lujan, Jr. | 126/362 |

Primary Examiner—Larry Jones
Attorney, Agent, or Firm—David L. Ray

[57] ABSTRACT

A method and apparatus for reducing the amount of energy consumed in heating a building with a direct fired boiler having a supply reheat line and return reheat line including operating the direct fired boiler at full capacity until the supply reheat water temperature reaches a preset temperature, and varying the total water in the return reheat line and the supply line to maintain the temperature differential between the temperature of the water in the return reheat line at a preset value. A method and apparatus for turning off one or more direct fired boilers utilizing two or more direct fired boilers connected in parallel when one or more of the direct fired boilers is not needed to heat the building is also disclosed. Each of the direct fired boilers having a supply reheat water line and a return reheat water line. The method and apparatus includes measuring the temperature of the return reheat water, comparing the temperature of the return reheat water to a preset temperature, turning off one of the direct fired boilers when the temperature of the return reheat is equal to the preset temperature, and stopping all water flow to the one direct fired boiler which is turned off.

24 Claims, 1 Drawing Sheet

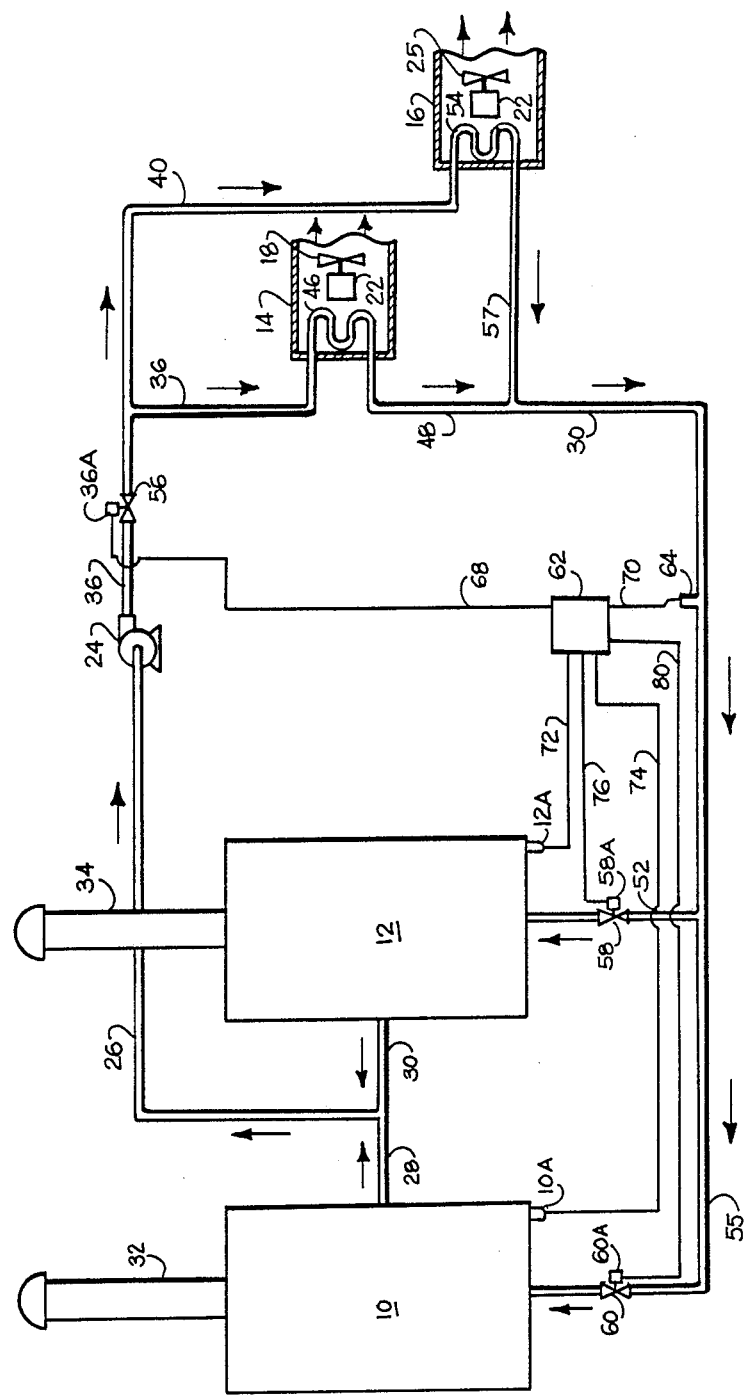

METHOD AND APPARATUS FOR SAVING ENERGY IN DIRECT FIRED BOILERS

BACKGROUND OF THE INVENTION

1. Field of the Invention

The present invention relates to direct fired boilers used to supply heated water for a large building. In particular, the invention relates to a method and apparatus for saving energy in the operation of a large building employing one or more direct fired boilers.

2. Description of the Related Art

Direct fired boilers are well known in the art and are commonly employed in large buildings to provide heated water for use at various locations in the building. Water is heated in direct fired boilers by burning natural gas or other fuel. The water may also be heated by electrical heating coils, if desired.

Water heated in direct fired boilers is pumped to the various locations throughout the building requiring heated water. Some direct fired boilers are used to provide heated water for lavatory and shower facilities located in the building, and for kitchens and cooking facilities in the building requiring hot water for washing dishes and other utensils. Such hot water uses require that the hot water be removed from the hot water lines extending from the direct fired boilers and therefore fresh water must be continually added to the direct fired boilers to replace the water withdrawn. The heated water supplied to such locations is referred to herein as domestic hot water.

Other direct fired boilers are used for supplying heated water to heating coils located throughout the building. The heating coils are used for heating the air within the building. After heated water is circulated through the heating coils, it is returned to the boiler for reheating. Such heating coils are commonly located in the ducts or vents sometimes referred to in the art as air handlers supplying air to the various rooms in the buildings to heat the air flowing into the rooms when desired. Heated water supplied to such heating coils from direct fired boilers is referred to herein as reheat water.

Direct fired boilers supplying reheat water are boilers which maintain the water heated therein at a temperature below the boiling point of water and do not produce steam. The temperature of the water in a direct fired boiler is commonly controlled by a conventional thermostat.

Reheat water is used to heat air in the building at various locations throughout the building. The heating coils receiving reheat water are commonly located adjacent to cooling coils receiving chilled liquids or gases from air conditioning units. Both the cooling coils and the heating coils are commonly located adjacent to each other in the duct or air handler supplying conditioned air to a room in a building. If it is desired to raise the temperature of a room being cooled by air blown over cooling coils, reheat water is directed to heating coils which are located in the airstream blown over the cooling coils. Thus the heating coils receiving reheat water can raise the temperature of the conditioned air being introduced into a room as desired.

Domestic hot water should not be mixed with reheat water because the reheat water usually contains chemicals or other additives to prevent scaling or contamination of reheat water flowlines that would contaminate domestic water. Therefore, separate direct fired boilers are required to furnish domestic hot water and to furnish reheat water.

It is common in large buildings for multiple direct fired boilers to be utilized to furnish reheat water. Multiple direct fired boilers are desired for many reasons. One of the reasons is that if one of the boilers cannot be used due to mechanical failure or routine maintenance, the other boiler or boilers may be utilized. Furthermore, it is sometimes necessary to utilize all or most of the boilers in order to adequately heat the building and supply reheat water to various locations in the building.

Direct fired boilers are commonly connected in parallel. Parallel connected direct fired boilers supply reheat water to a common manifold or header and receive reheat water returned from heating coils through a common manifold or header.

Furthermore, it is quite common for all direct fired boilers supplying reheat water to be operated continuously, twenty-four hours a day, even though the heating capacity of all boilers is not required to supply the reheat water needed by the building.

SUMMARY OF THE INVENTION

It is a object of the present invention to heat a building having multiple direct fired boilers furnishing reheat water when ambient conditions permit with less energy by turning one or more of the multiple direct fired boilers off and blocking water flow through the boiler which has been turned off.

It is another object of the present invention to save energy in the operation of a building with multiple direct fired boilers used for supplying heated water for heating coils by varying the total water flow through the direct fired boiler. Flow is varied through a selected direct fired boiler when the maximum heating capacity of a selected direct fired boiler is not required for supplying reheat water to heating coils. Flow is varied to match the amount of reheat water supplied by the direct fired boiler to the amount of reheat water needed by the heating coils, thereby reducing the amount of heat supplied by the boiler, the amount of energy consumed by the boiler, and the amount of energy or heat lost through the vent or flue of the boiler.

In accordance with the present invention there is provided a method and apparatus for reducing the amount of energy consumed in heating a building with a direct fired boiler having a supply reheat line and return reheat line including operating the direct fired boiler at full capacity until the supply reheat water temperature reaches a preset temperature, and varying the total water in the return reheat water line and the supply reheat water line to maintain the temperature differential between the temperature of the water in the return reheat line at a preset value.

The present invention also provides a method and apparatus for turning off one or more direct fired boilers in a building utilizing two or more direct fired boilers connected in parallel when one or more of the direct fired boilers is not needed to heat the building, each of the direct fired boilers having a supply reheat water line and a return reheat water line, including measuring the temperature of the return reheat water, comparing the temperature of the return reheat water to a preset temperature, turning off one of the direct fired boilers when the temperature of the return reheat is equal to the preset temperature, and stopping all water flow to the one direct fired boiler which is turned off.

BRIEF DESCRIPTION OF THE DRAWINGS

The drawing is a schematic representation of the method and apparatus of the present invention.

DESCRIPTION OF THE PREFERRED EMBODIMENTS

Referring now to the drawing, there is shown a hot water heating system utilized in a large building for supplying heated water to heating coils used for heating the air in the building. Heated water supplied to such heating coils is sometimes referred to herein as reheat water. The heating coils to which reheat water is supplied are located in the ducts or air handlers supplying conditioned air to a room and are commonly located adjacent to cooling coils in the air handlers.

The hot water heating system includes two direct fired boilers generally indicated by the numerals 10 and 12 which are used to supply heated water to room heating units or air handlers generally indicated by the numerals 14 and 16. "Direct fired boilers" as the term is used herein are boilers in which water is heated by electrical heating coils or by burning natural gas or other conventional fuel and which maintain the water heated therein at a temperature below the boiling point of water, thereby producing no steam. As is known in the art, various chemicals may be added to the reheat water being heated in direct fired boilers to prevent scaling or contamination of reheat water flowlines.

Room heating units or air handlers 14 and 16 are equipped with fans 18 and 25 driven by motors 22 which blow air in the direction indicated by the arrows adjacent to the fans 18 and 25. Only two room heating units 14 and 16 are shown, but a heating unit could be supplied, as is generally done, for each room which is desired to be heated, and cooling coils could be located adjacent to heating coils 46 and 54 inside air handlers 14 and 16 if desired.

Excess heat escapes from the boilers 10 and 12 through flues 32 and 34 in the conventional manner well known in the art. Each boiler has a conventional thermostat 10a and 12a which controls the temperature of the water in the boiler as desired by controlling the heat source used to heat water in the boiler.

Water flows from boilers 10 and/or 12 to pump 24 through pipes 28, 30, and 26 and from pump 24 through pipe 36 and automatic valve 56 to pipes 38 and 40 in the direction indicated by the arrows. Water from line 38 continues on to heating coil 46 contained in heating unit or air handler 14. From heating coil 46 water flows through pipe 48 to pipe 50 in the direction indicated by the arrows.

Heated water flowing through pipe 40 flows through heating coil 54 contained in heating unit or air handler 16. From heating coil 54 water flows through pipe 57 in the direction indicated by the arrows to pipe 50.

From pipe 50 water flows in the direction indicated by the arrows to pipes 52 and 55. From pipe 52 water flows through valve 58 to direct fired boiler 12 where it is reheated and flows to reheat water supply pipe 30. From pipe 55 water travels through valve 60 to direct fired boiler 10 where it is reheated and flows to reheat water supply pipe 28.

In accordance with the present invention, automatically controlled valves 56, 58 and 60 are controlled by comparator 62, which receives and monitors the temperature of return hot water in pipe 50 from temperature gauge or thermocouple 64. Comparator 62 may be any conventional comparator such as a microprocessor for comparing the temperature measurements received from temperature gauge or thermocouple 64 through electrically conductive line 70 and for sending control signals through electrically conductive lines 68, 76 and 80 to conventional electrical motor, solenoid or pneumatic valve controls 56a, 58a, and 60a, respectively, to open, close, or partially close automatic valves 56, 58, and 60, respectively, in accordance with the instructions programmed in comparator 62.

The apparatus and method of the present invention turns off one direct fired boiler when two direct fired boilers are not needed to provide reheat water to the heating coils. The direct fired boiler to be turned off is referred to as the lag boiler and the direct fired boiler to be left on is referred to as the lead boiler. For purposes of illustration, direct fired boiler 12 will be the lag boiler, and direct fired boiler 10 will be referred to as the lead boiler.

To determine when direct fired boiler 12 should be turned off, the return reheat water temperature in pipe 50 is measured by temperature gauge or thermocouple 64 and the measurement is transmitted through line 70 to comparator 62 which compares the temperature of the return reheat water to a programmed, preset temperature which corresponds to the temperature (sometimes referred to herein as boiler shut off temperature) the return reheat water reaches when only one of two direct fired boilers 10 and 12 is needed to heat the building. The temperature of the supply reheat water entering pipes 28 and 30 is controlled by thermostat 10a and 12a. When the return reheat water temperature as measured by thermocouple 64 is equal to the programmed boiler shut off temperature, comparator 62 turns off lag boiler 12 by sending control signal through electrically conductive line 72 connected to thermostat 12a and closes valve 58 by sending a signal from comparator 62 through line 76 to valve control 58a. Thus, no water can flow through lag boiler 12 and the entire amount of return reheat water circulates through pipes 50 and 55 through open valve 60 into lead boiler 10. When lag boiler 12 is turned off, no energy is lost from gases and heat escaping through flue 34, or from heat transfer through the walls of the boiler.

The boiler shut off temperature can be determined by experimentation with the multiple direct fired boilers located in a particular building, or by calculation. If more than two direct fired boilers are utilized in a building, it may be necessary to program the comparator with a different boiler shut off temperature as each one of three or more direct fired boilers is shut off.

To realize maximum savings, each one of the multiple boilers is shut off by comparator 62 as soon as the remaining boilers can supply the heat required by the building. The temperature of the return reheat water decreases when more heat is being removed from the heating coils than is supplied by a boiler or boilers, and reheat water temperature increases when less heat is being removed from heating coils than is being supplied by the boiler or boilers.

If the heating load or the amount of heat required by the heating coils 46 and 54 is further reduced after lag boiler 12 is shut off and only one boiler is operating, valve 56 is partially closed to restrict the amount of reheat water flowing to heating coils 46 and 54. To determine when valve 56 should be partially closed after lag boiler 12 has been shut off, comparator 62 compares the temperature indicated by temperature gauge 64 through line 70 to a preset programmed temperature sometimes referred to herein as the reduced flow temperature.

For example, comparator 62 is programmed to record when only one boiler is operating and then to compare the temperature at thermocouple 64 to the programmed reduced flow temperature. When the temperature in line 64 rises to the programmed reduced flow temperature, comparator 62 signals valve 56 through line 68 to partially close by a preset amount.

Thus, a smaller volume of reheated water enters heating coils 56 and 54 thereby reducing the amount of heat required to be generated by direct fired boiler 10. Furthermore, there is a decrease in the amount of energy consumed by pump 24 because less water is being pumped therethrough. Additional reduced flow temperatures can be programmed into comparator 62 to close valve 60 further as the amount of heat required by the heating coils 46 and 54 is reduced.

Although the preferred embodiments of the present invention have been disclosed and described in detail above, it should be understood that the invention is in no sense limited thereby, and its scope is to be determined by that of the following claims:

What is claimed is:

1. A method for reducing the amount of energy consumed in heating a building with a direct fired boiler having a supply reheat water line and a return reheat water line comprising:
   a. operating the direct fired boiler at full capacity until the supply reheat water temperature reaches a preset temperature, and
   b. varying the total water flow in the return reheat water line and the supply reheat water line to maintain the temperature of the water in the return reheat water line at a preset valve.

2. The method of claim 1 wherein said total water flow is varied by partially closing a valve.

3. The method of claim 2 wherein said valve is located in said supply reheat water line.

4. The method of claim 2 wherein said valve is located in said return reheat water line.

5. The method of claim 1 wherein said temperature of heated water in said return reheat water line is compared to a preset programmed temperature to determine the amount the total water flow in the supply reheat water line and the return reheat water line is varied.

6. The method of claim 1 wherein said heated water is circulated through said supply reheat water line and said return reheat water line by pump means.

7. An apparatus for reducing the amount of energy consumed in heating a building with a direct fired boiler having a supply reheat water line and a return reheat water line comprising:
   a. means for measuring the temperature of said return reheat water,
   b. means for comparing the temperature of said return reheat water to a preset programmed temperature, and
   c. means for varying the total flow of reheat water to match said temperature of said return reheat water to said preset programmed temperature.

8. The apparatus of claim 7 wherein said means for comparing the temperature of said return reheat water to said preset programmed temperature comprises a microprocessor.

9. The apparatus of claim 7 wherein said means for varying the total flow of reheat water comprises valve means.

10. The apparatus of claim 9 wherein said valve means is partially closed and opened by control means.

11. The apparatus of claim 9 wherein said control means is connected to and actuated by said means for comparing the temperature of said return reheat water to a preset programmed temperature.

12. The apparatus of claim 11 wherein said means for comparing the temperature of said return reheat water to a preset programmed temperature is connected to, and receives temperature measurements from, said means for measuring the temperature of said return reheat water.

13. The apparatus of claim 7 wherein pump means is connected to said return reheat water line for pumping water through said return reheat water line.

14. A method for turning off one or more direct fired boilers in a building utilizing two or more of said direct fired boilers connected in parallel when one or more of said direct fired boilers is not needed to heat the building, each of the direct fired boilers containing a supply reheat water line and a return reheat water line, comprising:
   a. measuring the temperature of the return reheat water,
   b. comparing said temperature of said return reheat water to a preset temperature,
   c. turning off one of said direct fired boilers when said temperature of said return reheat water is equal to said preset temperature, and
   d. stopping all water flow to said one direct fired boilers which is turned off.

15. The method of claim 14 wherein said reheat water is circulated through said supply reheat water line and said return reheat water line by pump means.

16. The method of claim 15 wherein each of said direct fired boilers has at least one valve means for controlling the flow of reheat water therethrough.

17. The method of claim 16 wherein water flow to said direct fired boiler which is turned off is stopped by closing said valve for controlling the flow to reheat water therethrough.

18. The method of claim 17 wherein each of said direct fired boilers has a valve for controlling the flow of reheat water therethrough.

19. An apparatus for turning off one or more direct fired boilers in a building utilizing two or more direct fired boilers connected in parallel when one or more of said direct fired boilers is not needed to heat the building, each of the direct fired boilers having a supply reheat water line and a return reheat water line connected thereto comprising:
   a. means for measuring the temperature of the return reheat water,
   b. comparator means connected to said means for measuring the temperature of the return reheat water for:
      i. comparing said temperature of said return reheat water to a preset temperature,
      ii. turning off one of said direct fired boilers and stopping the reheat water flow to said direct fired boiler which has been turned off when said temperature of said
   return reheat water is equal to said preset temperature.

20. The apparatus of claim 19 wherein said comparator means comprises a microprocessor.

21. The apparatus of claim 20 wherein each of said direct fired boilers has at least one valve means for controlling the flow of reheat water therethrough.

22. The apparatus of claim 21 wherein reheat water flow to said direct fired boiler in which has been turned off is stopped by closing said valve for controlling the flow of water therethrough.

23. The apparatus of claim 22 wherein said valve has control means connected thereto for opening and closing said valve, said control means being actuated and controlled by said comparator means.

24. The method of claim 23 wherein said control mean comprises a pneumatically operated piston means.

* * * * *